United States Patent [19]

Pischinger

[11] Patent Number: 5,890,466
[45] Date of Patent: Apr. 6, 1999

[54] DEVICE FOR INJECTING FUEL AT THE EXHAUST PORT OF AN ENGINE CYLINDER

[75] Inventor: Franz Pischinger, Aachen, Germany

[73] Assignee: FEV Motorentechnik GmbH & Co. KG, Aachen, Germany

[21] Appl. No.: 916,633

[22] Filed: Aug. 22, 1997

[30] Foreign Application Priority Data

Aug. 24, 1996 [DE] Germany ............... 296 14 753 U

[51] Int. Cl.⁶ ......................................... F02B 23/10
[52] U.S. Cl. ............................... 123/298; 123/305
[58] Field of Search .................... 123/305, 298, 123/276, 279

[56] References Cited

U.S. PATENT DOCUMENTS

| | | | |
|---|---|---|---|
| 4,958,604 | 9/1990 | Hashimoto | 123/305 |
| 5,058,549 | 10/1991 | Hashimoto et al. | 123/298 |
| 5,127,379 | 7/1992 | Kobayashi et al. | 123/661 |
| 5,335,635 | 8/1994 | Kadoi et al. | 123/298 |
| 5,421,301 | 6/1995 | Feuling | 123/298 |
| 5,540,200 | 7/1996 | Naitoh et al. | 123/305 |
| 5,720,253 | 2/1998 | Matoba et al. | 123/305 |
| 5,727,520 | 3/1998 | Wirth et al. | 123/305 |
| 5,735,240 | 4/1998 | Ito et al. | 123/305 |

FOREIGN PATENT DOCUMENTS

| | | |
|---|---|---|
| 0 463 613 | 9/1995 | European Pat. Off. . |
| 0 558 072 | 2/1996 | European Pat. Off. . |
| 36 22 616 | 2/1987 | Germany ............... 123/305 |

Primary Examiner—Erick R. Solis
Attorney, Agent, or Firm—Venable; Gabor J. Kelemen

[57] ABSTRACT

An internal-combustion engine includes an engine cylinder having an axis, a cylinder top and a cylinder chamber; a piston slidably received in the cylinder and bordering the cylinder chamber; an intake valve, an exhaust valve and an ignition device arranged at the cylinder top; and a fuel injection nozzle arranged at the cylinder top and opening into the cylinder chamber at a location adjoining the exhaust valve.

7 Claims, 2 Drawing Sheets

DEVICE FOR INJECTING FUEL AT THE EXHAUST PORT OF AN ENGINE CYLINDER

CROSS REFERENCE TO RELATED APPLICATION

This application claims the priority of German Application No. 296 14 753.2 filed Aug. 24, 1996, which is incorporated herein by reference.

BACKGROUND OF THE INVENTION

In Otto engines operating with fuel injection, the fuel is directly injected into the combustion chamber of the cylinder by a fuel injector. Dependent upon the moment of such injection, essentially two modes of operation may be distinguished.

In the "homogeneous" operational mode the fuel is injected into the combustion chamber at an early moment, generally during the inflow of the combustion air, that is, when the intake valve is open. In this manner, a satisfactory homogenization of the fuel-air mixture is achieved. Such a mode of operation is particularly suitable at high engine loads.

In the "stratified-charge" operational mode the injection occurs only after the intake valve is closed and when the piston, during its upward stroke, is close to its upper dead center. As a result, the fuel is mixed only with one part of the combustion air contained in the cylinder and also, only a locally limited mixing occurs until the fuel is ignited by the ignition device. Such a mode of operation is preferably used in the partial load or idling run of the engine. It is an advantage of this mode of operation that the engine may run without throttling of the intake air and yet, there is no risk that the fuel/air mixture is excessively lean in the vicinity of the ignition device for ensuring a reliable ignition.

For the above-outlined operational modes different processes for introducing the fuel into the cylinder chamber and for forming the mixture have been known. Such processes may be divided into two categories, namely, the "jet-guided" process and the "wall-guided" process.

In the "jet-guided" process the injected fuel jet is aimed directly onto the spark plug. The injected fuel cloud mixes with the combustion air and is ignited by the ignition device. A reliable stratified-charge operation is accordingly ensured only if the spark plug is positioned very close to the injector (fuel injection nozzle). Such an arrangement involves the disadvantage that only an extremely small operational point-specific ignition window is available and therefore a coordination (tuning) of the fuel jet expansion for large characteristic field ranges is critical. Consequently, the fuel injectors used in such systems have to be manufactured with high precision; even small tolerance deviations or changes in the injector during an extended operation may lead to disadvantageous boundary conditions for the ignition.

Thus, conditions of a reliable ignition in the stratified-charge operation may be ensured only by means of a precise geometrical arrangement of the ignition device and the fuel jet. Consequently, the known methods belonging to this category are designed without a definite and intensive charge motion. In the homogeneous operation, on the other hand, it is precisely such a charge motion that would be needed for improving the homogenization of the fuel/air mixture. The result is a loss of power and an increase of the fuel consumption which, in turn, involves a correspondingly increased release of pollutants into the atmosphere.

It is a further disadvantage of this process that because of the direct exposure of the spark plugs to the fuel jet, an increased spark plug wear occurs, resulting in a shortened service life of the spark plugs.

According to the "wall-guided" process, in the stratified-charge operation the fuel jet is deflected towards the ignition device by the wall of the combustion chamber. The resulting intensive charge motion has an enhancing effect. This method avoids a direct impingement of fuel on the spark plugs. Tolerance deviations and the operational condition of the fuel injectors are less critical than in the earlier-discussed jet-guided process. It is, however, a disadvantage of the wall-guided process that the fuel impinges on the combustion chamber wall during a direct injection into the cylinder chamber so that in certain operational conditions an incomplete combustion occurs which results in an increased emission of uncombusted hydrocarbons and soot. This process has been utilized heretofore with intake-side fuel injectors and is based on the generation of a rolling motion of the charge, particularly designed with respect to direction and sense of rotation. This type of charge motion is achieved by providing steep, upstanding intake ports, such as disclosed in European Patent No. 0 558 072. Such an arrangement, however, requires a correspondingly greater structural height of the engine. According to another solution, the desired motional configuration of the charge is obtained by a special form of the intake port or by the geometry at the seating zone of the intake valve, as disclosed in European Patent No. 0 463 613. Such a solution, however, has disadvantageous effects on the quality of flow of the intake system and thus on the fullload operation of the engine.

The intensive charge motion required in the stratified-charge operation is, however, disadvantageous in the homogeneous operation because of the resulting increased combustion noises and increased wall heat losses.

SUMMARY OF THE INVENTION

It is an object of the invention to provide an improved direct fuel injection of the type outlined earlier which substantially eliminates the above-discussed disadvantages of prior art arrangements.

This object and others to become apparent as the specification progresses, are accomplished by the invention, according to which, briefly stated, the internal-combustion engine includes an engine cylinder having an axis, a cylinder top and a cylinder chamber; a piston slidably received in the cylinder and bordering the cylinder chamber; an intake valve, an exhaust valve and an ignition device arranged at the cylinder top; and a fuel injection nozzle arranged at the cylinder top and opening into the cylinder chamber at a location adjoining the exhaust valve.

The advantage of the invention as outlined above resides in that by positioning the fuel injection nozzle in the region of the exhaust valve, an improved mixture preparation is achieved because the mixture formation occurs essentially at the hot exhaust side.

According to an advantageous feature of the invention, the fuel injection nozzle merges into the cylinder at an inclined angle to the cylinder axis and at an orientation toward the region of the intake valve. Such an arrangement has the advantage that even under different load conditions a highly satisfactory mixture formation takes place. As a result of this arrangement, in the idling run and up to a partial load range, the injected fuel jet is deflected and caused to move with turbulence by the piston base before the opening of the gas intake valve. At high load conditions and with a corresponding change of the moment of injection, the fuel is injected into the air vortex generated in the cylinder by the downward motion of the piston only after the opening of the intake valve so that in such a case too, a highly satisfactory fuel distribution is achieved. Expediently, the fuel injection nozzle is positioned in the cylinder head and opens into the cylinder chamber at the edge zone of the cylinder top in the vicinity of the cylinder wall so that even if during idling or partial load conditions injection takes place above the piston base into the residual vortex, a sufficient fuel jet length and thus a sufficient spreading of the fuel jet are obtained. As a result, at the moment of ignition a well ignitable fuel/air mixture is present at the ignition device.

According to a particularly advantageous application of the invention, the fuel injection nozzle is used in an engine cylinder of the type which has two exhaust valves and the fuel injection nozzle opens into the cylinder chamber in the region between the two exhaust valves.

According to a further advantageous feature of the invention, the piston base of the piston reciprocating in the cylinder is formed of two surfaces inclined towards one another in an inverted V-shaped (roof-shaped) configuration. One of the base surfaces is oriented towards the gas intake valve while the other is oriented towards the exhaust valve. As a result of such a configuration of the piston base, the desired load-dependent guidance of the injected fuel jet is obtained, because during idling and up to a partial load condition the fuel jet is injected in the direction of that surface of the piston base which is oriented towards the exhaust valve and by means of the air which is deflected by that base surface, the fuel arrives at the spark plug as a cloud of fuel/air mixture. During full load operation, that is, when the fuel jet enters the cylinder only after the gas intake valve is opened, the V-shaped configuration of the piston base again deflects the fuel/air mixture—formed during the downward motion of the piston—in the direction of the ignition device so that in this mode of operation too, a reliable ignition of the mixture is ensured.

According to yet another advantageous feature of the invention, that surface of the inverted V-shaped piston base which is oriented towards the exhaust valve has a dished depression facing towards the fuel injection nozzle. By virtue of such a dished depression, the deflection of the fuel/air mixture is advantageously affected during idling and up to a partial load range as well as in the range of full load conditions.

According to yet another advantageous feature of the invention, the cylinder top, similarly to the piston base, is composed of two surfaces inclined towards one another in an inverted V-shaped (roof-shaped) configuration such that the surfaces of the cylinder top correspond to the orientation of the respective surfaces of the piston base. The intake valve is arranged in one of the surfaces of the cylinder top, while the exhaust valve and the fuel injection nozzle are disposed in the other cylinder top surface. The above-outlined features concerning the shape of the piston base and the cylinder top are particularly advantageous when a plurality of exhaust valves is provided in one surface of the cylinder top and the fuel injection nozzle is situated between two exhaust valves.

Independently from the configuration of the cylinder top, but particularly when formed to have an inverted V shape, according to a further advantageous feature of the invention the intake port as well as the exhaust port merge into the cylinder chamber at an acute angle to the cylinder axis. In this manner, compact cylinder head structures are feasible and further, upon opening the intake valve, a rolling flow is obtained in the cylinder chamber so that in conjunction with the fuel injection which takes place from the hot exhaust side, an improved mixture preparation is achieved.

DESCRIPTION OF THE PREFERRED EMBODIMENT

Figure 1:
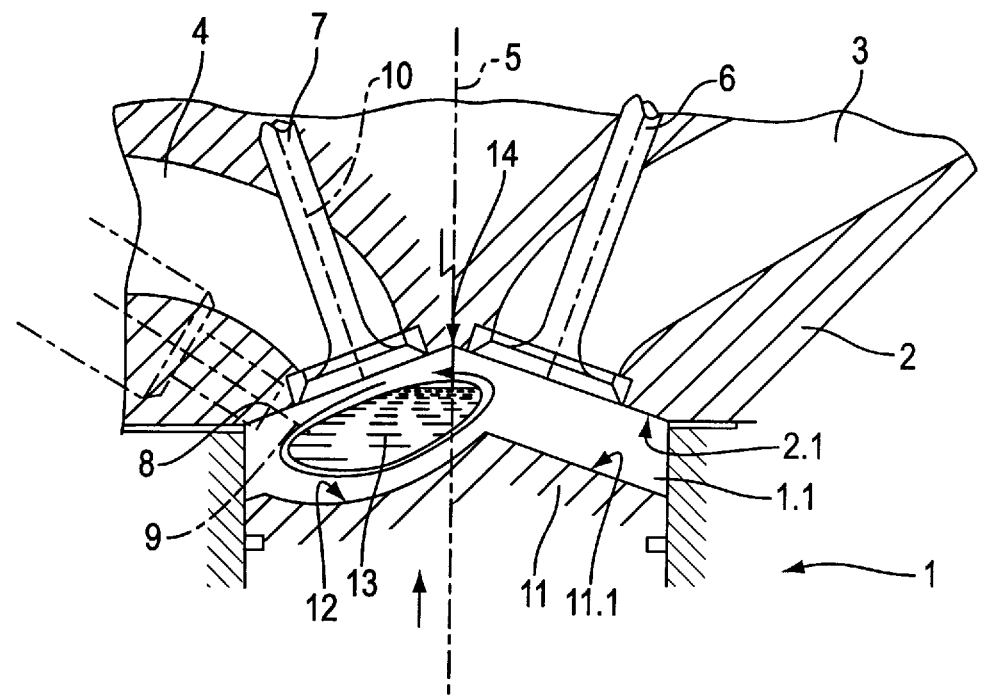
FIG. 1 is a fragmentary axial sectional view of an engine cylinder incorporating the invention, depicted during partial-load operation.
Figure 3:
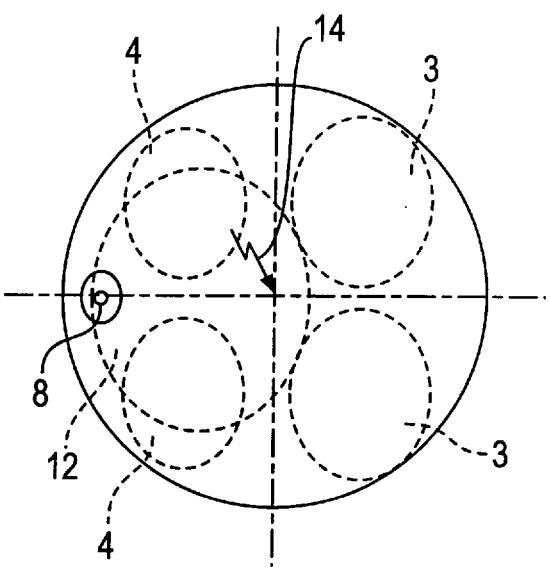
FIG. 3 is a schematic top plan view of the piston shown in FIGS. 1 and 2.

Turning to FIGS. 1 and 3, the cylinder 1 of an Otto-engine has a cylinder top 2.1 which is formed by an underface of a cylinder head 2. Two intake ports 3 and two exhaust ports 4 extend in the cylinder head 2 and open into the cylinder chamber 1.1 at the cylinder top 2.1 at an acute angle to the cylinder axis 5. The intake and exhaust ports 3 and 4 are controlled by openable and closable intake valves 6 and exhaust valves 7, respectively.

A fuel injection nozzle 8 is disposed in the cylinder head 2, in the region of the exhaust valves 7. In cylinder constructions having two exhaust valves 7 (as in the described embodiment), the fuel injection nozzle 8 is situated between the two exhaust valves 7. The jet axis 9 of the fuel injection nozzle 8 is oriented towards the cylinder axis 5 at an angle thereto which, however, is greater than the entrance angle of the exhaust ports 4 which is essentially defined by the longitudinal axis 10 of the exhaust valves 7. As a result, fuel is introduced into the combustion chamber 1.1 in a relatively flat course and an impingement on parts of the combustion chamber wall under the effect of the air vortex generated in the combustion chamber is substantially avoided.

In the described embodiment, the cylinder top 2.1 as well as the piston base 11.1 of the piston 11 are of inverted V-shaped (roof-shaped) configuration in which the inclined surfaces are oriented to the intake valves 6 and the exhaust valves 7, respectively. In that surface of the piston base 11.1 which is oriented towards the exhaust valves 7, a dished depression 12 is provided which faces the fuel injection nozzle 8.

FIG. 1 shows the position of the piston 11 in the cylinder chamber 1.1 during a stratified-layer operation, that is, for an operation which takes place during idling and up to a certain partial-load condition. During this operation a fuel jet 13, shaped as a fan by virtue of a suitable configuration of the fuel injection nozzle 8, is injected into the combustion chamber 1.1 at the end of the compression stroke. The fuel jet 13 impinges on the air vortex present in the dished depression 12 of the piston 11 and is, while forming an ignitable mixture, deflected towards the schematically illustrated ignition device 14 in a turbulent flow together with the air present in the cylinder and is ignited by the ignition device 14.

Figure 2:
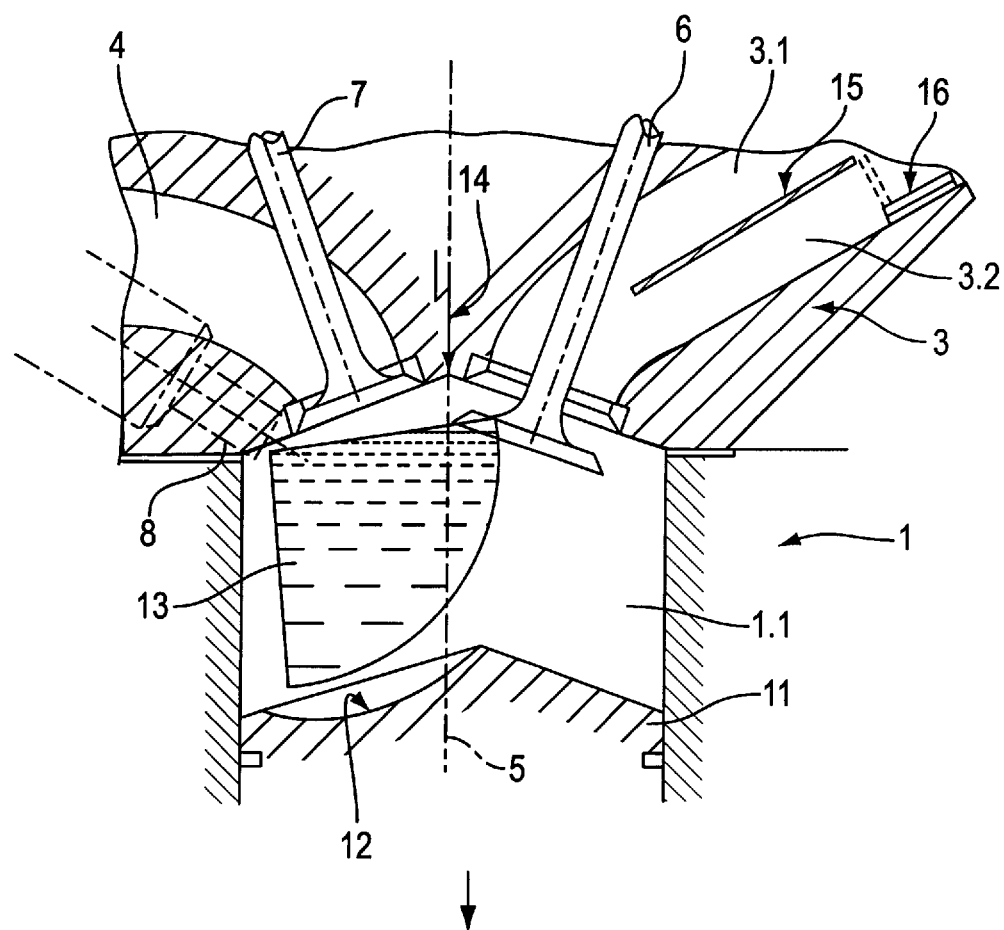
FIG. 2 is a view similar to FIG. 1 depicting the engine cylinder during full-load operation.

FIG. 2 shows the position of the individual components in the homogeneous operational mode, that is, at high-load conditions. During the downward motion of the piston 11 the intake valve 6 opens, and thus a spread-out (fan-shaped) fuel jet 13 is injected by the fuel injection valve 8 into the inflowing air. As a result, the desired highly satisfactory mixture formation may again occur, and after the closing of the intake valve 6 at the end of the compression stroke an ignition of the mixture by the ignition device 14 may take place. In such an operational mode, the effect of the dished depression 12 in the piston base 11.1 is of lesser significance because in this case the vortex formation is effected primarily by the intake air which flows into the combustion chamber through the intake ports 3.

In each intake port 3 a septum 15 is disposed which is oriented transversely to the cylinder axis 5 and which divides the respective intake port 3 into an upper partial port 3.1 and a lower partial portion 3.2. A controllable throttle 16 is situated in the respective lower partial port 3.2. This arrangement may further affect the formation of the gas vortex in the cylinder chamber 1.1, since dependent upon the air-throttling position of the throttle 16 a more or less pronounced rolling vortex is generated in the cylinder chamber 1.1.

It will be understood that the above description of the present invention is susceptible to various modifications, changes and adaptations, and the same are intended to be comprehended within the meaning and range of equivalents of the appended claims.

What is claimed is:

1. An internal-combustion engine comprising
   (a) an engine cylinder having an axis, a cylinder top and a cylinder chamber;
   (b) an intake valve arranged at said cylinder top;
   (c) an exhaust valve arranged at said cylinder top;
   (d) a piston slidably received in said cylinder and bordering said cylinder chamber; said piston having a piston base; said piston base being composed of first and second base surfaces inclined to one another to form an inverted V shape; said first base surface facing said intake valve and said second base surface facing said exhaust valve;
   (e) an ignition device arranged at said cylinder top; and
   (f) a fuel injection nozzle arranged at said cylinder top and opening into said cylinder chamber at a location adjoining said exhaust valve.

2. The internal-combustion engine as defined in claim 1, wherein said fuel injection nozzle is oriented in a direction of said intake valve obliquely to the cylinder axis.

3. The internal-combustion engine as defined in claim 1, further comprising a cylinder head having an underside constituting said cylinder top; said cylinder having a cylinder wall connected to said cylinder top; said fuel injection nozzle being supported in said cylinder head and opening into said cylinder chamber at a location adjoining said cylinder wall.

4. The internal-combustion engine as defined in claim 1, wherein said exhaust valve is a first exhaust valve; further comprising a second exhaust valve arranged at said cylinder top adjacent said first exhaust valve; said fuel injection nozzle opening into said cylinder chamber between said first and second exhaust valves.

5. The internal-combustion engine as defined in claim 1, wherein said second base surface has a dished depression facing said fuel injection nozzle.

6. The internal-combustion engine as defined in claim 1, wherein cylinder top is composed of first and second cylinder top surfaces inclined to one another to form an inverted V shape; said first and second cylinder top surfaces being oriented identically to said first and second base surfaces, respectively.

7. An internal-combustion engine comprising
   (a) an engine cylinder having an axis, a cylinder top and a cylinder chamber;
   (b) an intake valve arranged at said cylinder top;
   (c) a first exhaust valve arranged at said cylinder top;
   (d) a piston slidably received in said cylinder and bordering said cylinder chamber; said piston having a piston base; said piston base being composed of first and second base surfaces inclined to one another to form an inverted V shape; said first base surface facing said intake valve and said second base surface facing said first exhaust valve;
   (e) an ignition device arranged at said cylinder top;
   (f) a fuel injection nozzle arranged at said cylinder top and opening into said cylinder chamber at a location adjoining said first exhaust valve;
   (g) a cylinder head having an underside constituting said cylinder top; said cylinder having a cylinder wall connected to said cylinder top; said fuel injection nozzle being supported in said cylinder head and opening into said cylinder chamber at a location adjoining said cylinder wall; and
   (h) a second exhaust valve arranged at said cylinder top adjacent said first exhaust valve; said fuel injection nozzle opening into said cylinder chamber between said first and second exhaust valves.

* * * * *